United States Patent
Kowalczyk et al.

(10) Patent No.: US 10,194,679 B2
(45) Date of Patent: Feb. 5, 2019

(54) PROCESS FOR THE PRODUCTION OF FERMENTED BEVERAGES

(75) Inventors: Jörg Kowalczyk, Eisenberg/Steinborn (DE); Stephan Hausmanns, Mannheim (DE)

(73) Assignee: SUDZUCKER AKTIENGESELLSCHAFT, Mannheim, Ochsenfurt (DE)

( * ) Notice: Subject to any disclaimer, the term of this patent is extended or adjusted under 35 U.S.C. 154(b) by 1216 days.

(21) Appl. No.: 12/864,897

(22) PCT Filed: Jan. 21, 2009

(86) PCT No.: PCT/EP2009/000342
§ 371 (c)(1),
(2), (4) Date: Aug. 12, 2010

(87) PCT Pub. No.: WO2009/095171
PCT Pub. Date: Aug. 6, 2009

(65) Prior Publication Data
US 2010/0330234 A1    Dec. 30, 2010

(30) Foreign Application Priority Data

Jan. 31, 2008 (DE) .................. 10 2008 007 072

(51) Int. Cl.
A23L 2/60 (2006.01)
A23L 27/30 (2016.01)

(52) U.S. Cl.
CPC ............... *A23L 2/60* (2013.01); *A23L 27/30* (2016.08)

(58) Field of Classification Search
CPC ........................................ A23L 2/60
USPC ......................................... 426/48
See application file for complete search history.

(56) References Cited

U.S. PATENT DOCUMENTS

| 4,788,145 A | 11/1988 | Munir |
| 4,921,939 A * | 5/1990 | Nofre et al. ................. 558/414 |
| 5,578,339 A * | 11/1996 | Kunz et al. .................. 426/658 |
| 5,936,081 A * | 8/1999 | Degelmann et al. ......... 536/124 |
| 6,849,286 B1 * | 2/2005 | Bayerkohler et al. ....... 426/285 |
| 2007/0116801 A1 * | 5/2007 | Kowalczyk et al. .......... 426/16 |

FOREIGN PATENT DOCUMENTS

| DE | 3241788 A1 | 5/1984 |
| EP | 0483755 B | 5/1992 |
| EP | 0794259 B | 9/1997 |
| EP | 1393637 A1 | 3/2004 |
| EP | 1424074 | 6/2004 |
| JP | 05-227889 | 9/1993 |
| WO | WO 2007/107295 A | 9/2007 |

OTHER PUBLICATIONS

English language translation of the Notification of Transmittal of Translation of the International Preliminary Report on Patentability (Chapter I or Chapter II) of the Patent Cooperation Treaty)(Form PCT/IB/338), International Preliminary Report on Patentability (Chapter I of the Patent Cooperation Treaty)(Form PCT/IB/373) dated Sep. 28, 2010 and Written Opinion of the International Searching Authority (Form PCT/ISA/237) in corresponding International Application No. PCT/EP2009/000342.
International Search Report dated May 6, 2009, issued in corresponding international application No. PCT/EP2009/000342.
Nagai, Yukie et al. "Characterization of ∝-Glucosyltransferase from *Pseudomonas mesoacidophila* MX-45." Food Laboratory, Japan. Biosci. Biotech. Biochem., 58 (10), 1789-1793, 1994.
Notice of Reasons for Rejection dated Oct. 16, 2012 in corresponding Japanese Patent Application No. 2010-544619 (with English language translation).

* cited by examiner

*Primary Examiner* — D. Lawrence Tarazano
*Assistant Examiner* — Philip A Dubois
(74) *Attorney, Agent, or Firm* — Ostrolenk Faber LLP

(57) ABSTRACT

Processes for the continuous production of fermented, trehalulose-containing beverages, in particular ready-to-drink beverages or beverage concentrates.

8 Claims, No Drawings

PROCESS FOR THE PRODUCTION OF FERMENTED BEVERAGES

CROSS REFERENCE TO RELATED APPLICATIONS

The present application is a 35 U.S.C. § 371 National Phase conversion of PCT/EP2009/000342, filed Jan. 21, 2009, which claims benefit of German Application No. 10 2008 007 072.6, filed Jan. 31, 2008, the disclosure of which is incorporated herein by reference. The PCT International Application was published in the German language.

TECHNICAL FIELD

The present invention relates to processes for the production, in particular continuous production, of fermented, trehalulose-containing beverages, in particular ready-to-drink beverages or beverage concentrates.

BACKGROUND

Trehalulose (1-O-α-D-glucopyranosyl-D-fructose) is a heterodisaccharide in which glucose and fructose form an α-1,1 bond. It is known as a digestible, non-cariogenic sweetener which has similar physiological properties to isomaltulose. However, the sweetening strength of trehalulose is only 40 to 50% of that of sucrose.

According to DE 32 41 788, trehalulose is cleaved only with difficulty by the enzyme system in the human small intestine and is therefore absorbed only partly and at a delayed time. EP 1 424 074 discloses a nutritional composition for controlling the blood sugar level and for preventing obesity, which comprises isomaltulose or trehalulose. EP 1 393 637 A1 discloses agents for improving concentration and attentiveness which, besides isomaltulose, also comprise trehalulose.

EP 0 483 755 B1 discloses a process for producing trehalulose and isomaltulose from sucrose. According to the procedure disclosed therein, a sucrose-containing solution is brought into contact with a trehalulose-forming enzyme, and a trehalulose syrup is obtained. The trehalulose-forming enzyme is an enzyme which originates from a microorganism of the genus *Pseudomonas* or *Agrobacterium*. The specification discloses that the use of these microorganisms leads to a high trehalulose yield, with only very little monosaccharides being produced as by-products at the same time. In view of the virtually complete conversion, described in this specification, of sucrose to a trehalulose-containing mixture having only approximately half of the sweetness of a comparable sucrose solution, the disclosed trehalulose-containing mixture cannot therefore be used as sucrose substitute in beverages without additional process steps such as the addition of sweeteners. The processes known from EP 0 794 259 B1 for producing trehalulose-containing beverages are accordingly disadvantageous insofar as they provide for the separate addition of further sweeteners in order to obtain a consumable beverage.

SUMMARY

The present invention is therefore based on the technical problem of providing an improved process for producing sweet, reduced-cariogenic, fermented beverages which overcomes the aforementioned disadvantages, in particular permits a particularly simple and economical production of said beverages.

The invention provides a solution to this technical problem in the form of the teaching of the independent claim. In particular, the present invention solves the technical problem through the provision of a process for the production, in particular continuous production, of a fermented, reduced-cariogenic beverage, this process involving the following steps in the stated order or, in a preferred embodiment, consisting of the following steps in the stated order:

a) bringing into contact of a sucrose-containing substrate, for example a sucrose-containing solution or a fruit juice or a syrup of a fruit juice extract or syrup of a fruit juice concentrate, with a trehalulose-forming system at a temperature of from 10 to 30° C. with the targeted adjustment of fermentation conditions suitable for an enzymatic conversion, such that the sucrose present in the solution is converted enzymatically into a trehalulose mixture up to a residual sucrose content of from 10 to 70% by weight, in particular 20 to 40% (% by weight, based on the weight of the sugars present in the rearrangement solution, in each case dry substance), b) filtration of the resulting trehalulose mixture to separate off the trehalulose-forming system and, preferably without carrying out further purification steps, c) addition of at least one, preferably non-sweetening, beverage additive, for example a food-grade acid and/or at least one flavoring, for example aroma substance, fruit juice extract, herb extract, fruit extract or tea extract, to the filtered trehalulose mixture obtained in step b), such that a sweet, fermented, reduced-cariogenic, preferably ready-to-drink beverage is obtained.

DETAILED DESCRIPTION

In a preferred embodiment, the invention provides a process which makes it possible, in a process, in particular continuous process, directly after, preferably continuously, with the production of the sweetener used for the beverage production, to produce the consumable beverage comprising this sweetener. In an advantageous manner, this is preferably possible according to the invention without further sweeteners, such as sugars, i.e. in particular sucrose, glucose or fructose or sugar substitutes, such as sugar alcohols, or intense sweeteners having to be added separately during the production of the beverage. In a preferred embodiment, the invention therefore relates to an aforementioned process which is characterized by the absence of process steps which provide for an addition of sugars, sugar substitutes, sugar alcohols and/or intense sweeteners. The procedure according to the invention preferably permits the provision of a consumable trehalulose-containing, reduced-cariogenic beverage which, in terms of its sweetening strength and its organoleptic properties, essentially corresponds to or even improves upon the properties of customary sweetened beverages, for example those based purely on sucrose.

It is an essential feature of the present teaching that the rearrangement solution obtained in step a), i.e. the trehalulose mixture, which is preferably present as aqueous rearrangement solution, is used as beverage additive directly and immediately, i.e. apart from the separation off of the trehalulose-forming system effected by filtration, without further process steps, in particular purifications. Surprisingly, beverages and beverage concentrates produced in this way exhibit a considerably improved taste profile in the sensory test. The fermented beverages produced are more full-bodied, more aromatic and have a more balanced sweetness. Without wishing to be bound by the theory, the improved sensory properties achieved in this way and the improved taste profile may be caused by the presence of fermentation by-products, which are not removed during the production process and which enter into synergistic effects with aroma components.

The present procedure is also advantageous insofar as that it permits the direct, preferably continuous production of fermented beverages with a sweetener content, in particular a trehalulose content, without the sweetener component having to be stored, stored temporarily or conditioned prior to production of the beverage. In an advantageous manner, as explained, the beverage production can thus take place immediately after or preferably continuously with the production process for the sweetener component of the beverage. In an advantageous manner, at the same time as the production of the beverage, as a result of the targeted and controlled adjustment of the fermentation conditions in step a) of the process that is provided according to the invention, the desired sweetness content of the beverage can be adjusted without sweetening components such as sucrose, intense sweeteners or the like having to be added separately. This sweetness content is determined from the fraction of the unreacted sucrose having a comparatively high sweetening strength, the fraction of resulting trehalulose, and of the by-products isomaltulose, glucose, fructose, isomaltose and traces of oligosaccharides. The procedure according to the invention therefore permits, by controlling the fermentation conditions, the targeted adjustment of a desired sweetness content, where the sweetener mixture provided in the beverage and comprising at least trehalulose sweetener mixture comprising at least trehalulose and sucrose, on account of the content of trehalulose, is calorie-reduced and also has a reduced cariogenic effect and where the mixture can be produced economically and simply in a preferably continuous procedure, i.e. in an online process.

In a particularly preferred embodiment, the invention therefore envisages a process for producing a fermented, reduced-cariogenic beverage, where the production of the beverage on its own consists of the stated process steps a), b) and c). In a particularly preferred embodiment, the sucrose-containing substrate is therefore brought into contact with a trehalulose-forming system to produce a rearrangement solution comprising the trehalulose mixture, the trehalulose-forming system is separated off from the rearrangement solution and the rearrangement solution is used directly and apart from the carried-out separating off of the trehalulose-forming system, immediately without further purification or other process steps, as a component of a beverage or beverage concentrate and accordingly is located in this form in the ultimately consumed beverage.

In connection with the present invention, the term "beverage" is understood as meaning a ready-to-drink beverage, preferably based on water, but also a beverage concentrate which can be prepared, for example, by evaporating the resulting trehalulose mixture with the at least one beverage additive and, prior to consumption, made ready-to-drink using a solvent, for example water, and, if appropriate, $CO_2$. Consequently, in connection with the present invention, the prepared beverages may be present in the form of solutions, concentrates, extracts, beverage powders or suspensions.

In connection with the present invention, a beverage is also understood as meaning a fruit beverage, a smoothie or after thickening, i.e. the removal of water, also a fruit concentrate, for example used for producing fruit preparations such as yoghurt products.

In connection with the present invention, a sucrose-containing substrate is understood as meaning a substrate which has sucrose and is used in process step a) for the conversion to the trehalulose mixture. A sucrose-containing substrate can be, for example, an aqueous sucrose-containing solution, an aqueous solution or a syrup of a sucrose-containing fruit juice extract, a sucrose-containing syrup, a sucrose-containing fruit juice concentrate in syrup form, a sucrose-containing fruit concentrate, a sucrose-containing fruit juice, a sucrose-containing fruit juice powder or an aqueous syrup of sucrose-containing fruit preparations or the like. In a preferred embodiment, this substrate, whether present for example in the form of a fruit juice extract, fruit juice concentrate, fruit juice powder or sucrose, is brought into solution, preferably aqueous solution, in order to permit the subsequent enzymatic conversion. The sucrose-containing substrate is then present as sucrose-containing solution.

In connection with the present invention, purification of a mixture or a rearrangement solution is understood as meaning the separation off of at least one substance from this mixture or the solution, where this separated-off substance is not water.

Particularly preferably, the sucrose content of the sucrose-containing solution is 3 to 100% by weight, preferably 3 to 99% by weight, in particular 20 to 100% by weight (in each case based on dry substance, abbreviated to on DS), preferably 25 to 90% by weight, 30 to 80% by weight, 35 to 45% by weight, 40 to 75% by weight, in particular 45 to 70% by weight or preferably 50 to 65% by weight (in each case on DS of the solution). In a particularly preferred embodiment, the sucrose content of the sucrose-containing solution is around 5 to 100%, preferably 10 to 50%, in particular 20 to 40% (in each case based on the residual sucrose content of the trehalulose-containing mixture, on DS) higher than the residual sucrose content of the trehalulose-containing mixture (on DS). In a preferred embodiment, in the sucrose-containing solution, prior to fermentation, no trehalulose is present or trehalulose is present in an amount of from 0.1 to 5% by weight, in particular 0.1 to 3% by weight (in each case on DS).

In connection with the present invention, fermentation conditions suitable for enzymatic conversion, in particular fermentation conditions to be adjusted in a targeted manner, are understood as meaning in particular the temperature used in process step a), the pH and the conversion time.

In a particularly preferred embodiment, during the fermentation in process step a) the composition of the rearrangement solution present, i.e. of the sugar solution, is continually or periodically controlled in order, in so doing, to be able to ensure the targeted control and/or regulation of the desired product, i.e. of the desired sugar composition, in particular of the desired ratio of trehalulose to sucrose, during the continuous process.

In connection with the present invention, a trehalulose-containing mixture, which is also referred to here as trehalulose mixture, is understood as meaning a mixture which comprises at least trehalulose and (residual) sucrose, and originates from the fermentation according to step a) of the present process sequence.

In a preferred embodiment, the conversion time is advantageously controlled by the flow rate of the sucrose-containing solution to be converted through the container used for carrying out process step a), in particular the bioreactor.

In a further preferred embodiment, it is envisaged that the process according to the invention, in particular step a) thereof, is carried out at a temperature of from 10 to 25° C., preferably 10 to 20° C., preferably 10 to 17° C. In a further preferred embodiment, it is envisaged that the process according to the invention, in particular step a) thereof, is carried out at a pH of from 5.0 to 7.0, preferably 6.0 to 7.0.

In a further preferred embodiment, it is envisaged that the process according to the invention, in particular step a) thereof, is carried out under aerobic conditions. According to the invention, it may be envisaged to carry out the fermentation in process step a) in a customary bioreactor or fermenter, for example with aeration rates of from 1/10 to 1 vvm. In a preferred embodiment, a circulation of the rearrangement solution can also be carried out, in particular with revolutions from 100 to 600 rpm.

In a particularly preferred embodiment, it may be envisaged to adjust the fermentation condition in a targeted manner such that, in the rearrangement solution obtained after the conversion, i.e. the solution which comprises the trehalulose mixture, 10 to 70% by weight, preferably 20 to 40% by weight, of sucrose, 0 to 10% by weight of isomaltulose, 0 to 3% by weight of other carbohydrates, for example glucose, fructose and isomaltulose, and 50 to 80% by weight of trehalulose are present, where the total amount of the components gives 100% by weight (based on the dry weight (DS) of the sugars present in the conversion solution).

In an advantageous preferred manner, the sucrose-containing solution preferably used is preferably an aqueous sucrose solution. The sucrose-containing substrate used according to the invention, for example the sucrose-containing solution or a fruit juice concentrate, preferably has a sucrose content of from 0.1% by weight to 60% by weight, in particular 10% by weight to 60% by weight, preferably 20% by weight to 50% by weight, of sucrose (based on the total weight of the substrate, for example the solution).

In connection with the present invention, a beverage additive is understood as meaning a component present in the beverage in addition to the trehalulose mixture acting as sweetener, which component has bodying and/or organoleptic, for example gustatory or pharmaceutical, properties. Examples of beverage additives within the context of the present invention are flavorings, fragrances, dyes, fillers, vitamins, salts, pharmaceutically active substances, fruit extracts, fruit concentrates, milk, cocoa, tea, alcohol, etc.

In a particularly advantageous manner, it is envisaged that, in process step c), $CO_2$ is introduced into the filtered trehalulose mixture, i.e. a carbonation is carried out.

In a further advantageous embodiment, it is envisaged that the trehalulose-forming system is an immobilized system. For the immobilization of the enzymatic activity used, it is possible to use customary processes, for example the use of sodium alginate beads which have trehalulose-forming enzymes or microorganisms immobilized thereon.

In a further preferred embodiment, it can be envisaged to use the trehalulose-forming system in non-immobilized form.

In a particularly preferred embodiment, it is envisaged that the trehalulose-forming system is a trehalulose-forming enzyme, i.e. is a glucosyltransferase, which is able to form trehalulose from sucrose, in particular a trehalulose mixture of trehalulose and isomaltulose, and also optionally glucose, isomaltose and fructose with an increased trehalulose fraction compared to isomaltulose. In one particularly preferred embodiment, the trehalulose is present relative to the isomaltulose in the prepared trehalulose mixture in a ratio of from 4:1 to 10:1.

In a further preferred embodiment of the invention, the trehalulose-forming system used is a microorganism which comprises at least one enzyme defined above.

In a particularly advantageous embodiment of the present invention, the trehalulose-forming enzyme used is an enzyme which originates from a microorganism of the genus *Pseudomonas*, in particular from *Pseudomonas mesoacidophila* MX-45 (FERN BP 3619). This organism is described for example in EP 0 483 755 B1 or Nagai et al., (Biosci. Biotech. Biochem. 58 (10) 1789-1793 (1994)).

It may of course also be envisaged that the enzymes are not of natural origin, but instead are mutated enzymes, in particular those which are prepared on the basis of mutations in the genetic material of the aforementioned microorganisms.

In one embodiment, it is envisaged, in step b) of the process, in addition to the filtration, that a deionization is also carried out, for example via an ion exchanger. In one preferred embodiment, a deionization is not carried out.

According to the invention, in a further embodiment, it may be envisaged to carry out a decoloration, for example with activated carbon, in step b) or in step c). In a preferred embodiment, a decoloration is not carried out.

In a particularly preferred embodiment, the invention envisages that, in the overall process operation, no addition of sweetening substances, in particular sweetening beverage additives, preferably sweeteners, in particular of sugars, sugar substitutes and/or intense sweeteners, takes place. In a particularly preferred embodiment, all sweetening components of the resulting trehalulose mixture used in the sweet beverage thus originate directly from the sucrose-containing substrate used.

In a further preferred embodiment, the procedure according to the invention is characterized in that, in none of the envisaged process steps, a cleavage, in particular a significant cleavage, of sucrose into glucose and fructose takes place, for example enzymatically by means of an invertase or acid-catalyzed.

In a further preferred embodiment, it is envisaged that, in step b) or in step c) of the process, an introduction of solvent, in particular water, or a concentration of the components, in particular of the trehalulose mixture, takes place.

In a particularly preferred embodiment, it is envisaged that citric acid or lactic acid is used as food-grade acid.

In a further preferred embodiment, it can be envisaged that, in addition to the trehalulose-containing mixture that forms as a result of the rearrangement in the beverage, which has 10 to 70% by weight, preferably 20 to 40% by weight, of sucrose, additionally an intense sweetener can be added separately. In a further preferred embodiment, accordingly, it can be envisaged, in step c) of the process according to the invention, to also add intense sweeteners, such as aspartame, cyclamate, acesulfame-K, glycyrrhizin, saccharin, rebaudiosides, sucralose, alitames, neohesperidin dihydrochalone, steviosides, thaumatin or the like, to the trehalulose mixture.

In a further preferred embodiment, it may also be envisaged that sugar alcohols are admixed with the trehalulose-containing mixture in step c) of the process, for example isomalt, isomalt ST, isomalt GS, mannitol, sorbitol, xylitol, erythritol or maltitol.

In a further preferred embodiment, it is envisaged that the beverage produced is a refreshment beverage, sports beverage, milk beverage, carbonated beverage, sweetened mineral water, lemonade, herbal lemonade, fruit juice beverage, energy beverage, alcoholic beverage, sour milk beverage, soft drink, coffee, tea, cocoa beverage, fruit juice, vegetable juice, smoothie, fruit drink, fruit preparation or the like.

In a particularly preferred embodiment, the process is carried out in continuous form. In a further preferred embodiment, however, it may also be envisaged to carry out the process discontinuously or semicontinuously. In particular, according to the invention, it is also possible to carry out a batch fermentation.

Further advantageous embodiments of the invention arise from the dependent claims.

The invention is illustrated in more detail by reference to the following example.

Example

To prepare the biocatalyst, cells from an inoculation of the strain *Pseudomonas mesoacidophila* MX-45 (also deposited under FERM BP 11 808) were elutriated with 10 ml of a sterile nutrient substrate comprising 8 kg of concentrated juice from a sugar factory (dry substance content=65%), 2 kg of maize steep liquor, 0.1 kg of $(NH_4)_2HPO_4$ and 89.9 kg of distilled water adjusted to a pH of 7.2. This suspension served as inoculation material for a shake-machine preculture in a 1 liter flask with 200 ml of the nutrient solution.

After incubation for 30 hours at 29° C., using in each case 10 flasks (total content 2 liters), 18 liters of nutrient solution of the above composition were inoculated in a 30 liter small fermenter and fermented at 29° C. with 20 liters of air per minute and a stirring speed of 350 rpm.

After achieving microbial counts above $5 \times 10^9$ microbes/ml, the fermentation was switched off, the cells were harvested out of the fermenter solution by centrifugation, suspended in a 2% strength sodium alginate solution and immobilized by adding the suspension dropwise to a 2% strength calcium chloride solution. The resulting immobilizate beads were washed with water.

To produce the fermented beverage, the immobilized cells of *Pseudomonas mesoacidophila* MX-45 obtained in this way were fed into a heatable reactor. Said reactor was heated to 25 to 30° C. and a sucrose solution with a DS content of about 35 to 45% was continuously passed through. The flow rate was adjusted here in a targeted manner such that a residual sucrose content of from 20 to 40% by weight was obtained in the resulting trehalulose mixture-containing rearrangement solution (based on DS of all sugars of this rearrangement solution). The rearrangement solution was continuously monitored as regards it composition and the flow rate adjusted and/or maintained such that the desired residual sucrose content coupled with simultaneous trehalulose enrichment was ensured.

The trehalulose mixture-containing solution produced in this way (Table 1) was filtered to separate off the immobilized cells and then, if desired, deionized on a cation and anion exchanger.

HPLC analysis of the trehalulose mixture emerging from the reactor revealed the following composition:

TABLE 1

| | |
|---|---|
| Fructose | 0.2% on DS |
| Glucose | 0.2% on DS |
| Sucrose | 25% on DS |
| Isomaltulose | 9.5% on DS |
| Isomaltose | 0.1% on DS |
| Trehalulose | 64.8% on DS |
| Oligomers (DP > 3) | 0.2% on DS |

Citric acid, vitamin C and various other additives were then metered in continuously, as is evident from the following Tables 2 (refreshment beverage), 3 (orange fruit juice beverage) and 4 (milk beverage).

TABLE 2

Refreshment beverage (weight fractions based on 250 ml of finished beverage; residual fraction: water)

| | |
|---|---|
| Trehalulose mixture with residual sucrose content of 25% by weight | 8 weight fractions |
| Citric acid | 0.15 weight fractions |
| Vitamin C | 0.03 weight fractions |
| Sodium chloride | 0.05 weight fractions |
| Potassium chloride | 0.04 weight fractions |
| Calcium chloride | 0.012 weight fractions |
| Magnesium carbonate | 0.002 weight fractions |
| Sodium glutamate | 0.006 weight fractions |

TABLE 3

Orange fruit juice beverage (weight fractions based on 250 ml of beverage; residual fraction: water)

| | |
|---|---|
| Trehalulose mixture with residual sucrose content of 25% by weight | 16 weight fractions |
| Orange fruit juice, 1/5 concentrate | 4 weight fractions |
| Citric acid | 0.35 weight fractions |
| Sodium citrate | 0.20 weight fractions |
| Vitamin C | 0.6 weight fractions |
| Beta-carotene | 0.01 weight fractions |

TABLE 4

Sweetened milk beverage (weight fractions based on 100 ml of beverage)

| | |
|---|---|
| Trehalulose mixture with residual sucrose content of 25% by weight | 4 weight fractions |
| Fresh milk | 96 weight fractions |

To produce the milk beverage, after adding the milk component to the trehalulose mixture-containing solution, the resulting mixture was sterilized and concentrated to a 75% strength syrup and bottled under sterile conditions.

What is claimed is:

1. A process for continuously producing a fermented, sweet, reduced-cariogenic beverage directly out of a sucrose-containing substrate, wherein
    a) the sucrose-containing substrate is brought into contact with a trehalulose-forming system at a temperature of from 10 to 30° C. and a pH of from 5 to 7, and permitted to ferment such that the sucrose present in the substrate is converted enzymatically into a trehalulose mixture having a residual sucrose content of from 10 to 70% by weight of total sugars, based on the weight of the sugars present in the sucrose-containing substrate, wherein the trehalulose-forming system is an immobilized system or a non-immobilized system and wherein said immobilized or non-immobilized system is a trehalulose-forming enzyme or a trehalulose-forming microorganism,
    b) the resulting material from step (a), following such fermentation, is filtered to separate the trehalulose mixture from the trehalulose-forming system to obtain the trehalulose mixture as the beverage and,
    c) without carrying out any further concentration or purification of the beverage, at least one nonsweetening beverage additive is added to the beverage to obtain the fermented, sweet, reduced-cariogenic beverage.

2. The process according to claim 1, wherein $CO_2$ is introduced into the beverage in step c).

3. The process according to claim 1, wherein the trehalulose-forming system is a trehalulose-forming microorganism and wherein the microorganism belongs to a genus *Pseudomonas*.

4. The process according to claim 3, wherein the microorganism belonging to the genus *Pseudomonas* is *Pseudomonas mesoacidophila* MX-45, FERM BP 3619.

5. The process according to claim 1, wherein the process is carried out at a temperature of from 10 to 20° C.

6. The process according to claim 1, wherein trehalulose and isomaltulose are present in a weight ratio of from 4:1 to 10:1 in the trehalulose mixture obtained in step a).

7. The process according to claim 1, wherein the residual sucrose content is 20 to 40% by weight.

8. The process according to claim 1 wherein the non-sweetening beverage additive is at least one of a food grade acid and at least one flavoring.

\* \* \* \* \*